US 8,443,237 B2

(12) United States Patent
Konishi et al.

(10) Patent No.: US 8,443,237 B2
(45) Date of Patent: May 14, 2013

(54) STORAGE APPARATUS AND METHOD FOR CONTROLLING THE SAME USING LOOPBACK DIAGNOSIS TO DETECT FAILURE

(75) Inventors: Yusuke Konishi, Odawara (JP); Hiroshi Izuta, Odawara (JP); Hiroyoshi Suzuki, Numadu (JP)

(73) Assignee: Hitachi, Ltd., Tokyo (JP)

( * ) Notice: Subject to any disclaimer, the term of this patent is extended or adjusted under 35 U.S.C. 154(b) by 434 days.

(21) Appl. No.: 12/744,341

(22) PCT Filed: May 12, 2010

(86) PCT No.: PCT/JP2010/003215
§ 371 (c)(1),
(2), (4) Date: May 24, 2010

(87) PCT Pub. No.: WO2011/141961
PCT Pub. Date: Nov. 17, 2011

(65) Prior Publication Data
US 2011/0283150 A1    Nov. 17, 2011

(51) Int. Cl.
*G06F 11/00* (2006.01)
(52) U.S. Cl.
USPC ............................................................ 714/43
(58) Field of Classification Search .................. None
See application file for complete search history.

(56) References Cited

U.S. PATENT DOCUMENTS

| 7,360,119 | B1   |   | 4/2008 | Stenfort et al. |         |
|-----------|------|---|--------|-----------------|---------|
| 7,536,584 | B2   | * | 5/2009 | Davies et al.   | 714/5.11|
| 7,673,185 | B2   | * | 3/2010 | Kalwitz et al.  | 714/43  |
| 7,809,983 | B2   | * | 10/2010| Suzuki et al.   | 714/14  |
| 8,095,820 | B2   | * | 1/2012 | Douchi et al.   | 714/6.13|
| 8,255,737 | B1   | * | 8/2012 | Aster et al.    | 714/5.1 |
| 2007/0076321 | A1 |   | 4/2007 | Takahashi et al.|         |
| 2008/0276061 | A1 | * | 11/2008| Takaoka et al.  | 711/170 |
| 2009/0222623 | A1 |   | 9/2009 | Nakamura et al. |         |
| 2009/0265577 | A1 |   | 10/2009| Haramai et al.  |         |

FOREIGN PATENT DOCUMENTS

| JP | 2009-211140 | 9/2009 |
|----|-------------|--------|
| JP | 2009-259031 | 11/2009|

OTHER PUBLICATIONS

International Search Report in International Application No. PCT/JP2010/003215 mailed Mar. 4, 2011.
Written Opinion in International Application No. PCT/JP2010/003215 mailed Mar. 4, 2011.
"American National Standard for Information Technology—Serial Attached SCSI (SAS)", American National Standard, XX, XX, vol. 376-2003, Nov. 11, 2003, XP009049765.

\* cited by examiner

*Primary Examiner* — Michael Maskulinski
(74) *Attorney, Agent, or Firm* — Brundidge & Stanger, P.C.

(57) ABSTRACT

An objective is to allow a storage apparatus to accurately locate a failure site upon occurrence of a failure. Provided is a storage apparatus 10 including: a controller 11 that performs data input and data output into and from a storage drive 171 in response to a data input/output request sent from an external device 2; and expanders 112, 121 each having a switch circuit 1122 provided with a physical port (Phy 1121). In this storage apparatus 10, the controller 11 performs a loopback diagnosis on the expanders 112, 121, and performs a connection-based diagnosis on a target device by sending a connection frame thereto, the target device being a device detected as having a failure. When a response to the connection frame includes information indicating a failure, the controller 11 disables the physical port to which the target device is coupled, or the physical port of the switch circuit 1121 existing on a path from the controller 11 to the target device.

13 Claims, 16 Drawing Sheets

Fig. 6

FUNCTIONS OF FAILURE MONITOR 1113

- 611 BROADCAST PROCESSOR
- 612 DISCOVER PROCESSOR
- 613 LOOPBACK DIAGNOSIS PROCESSOR
- 614 VIRTUAL COUPLING SETTING PROCESSOR
- 621 DEVICE INFORMATION MANAGEMENT TABLE

Fig. 7

DEVICE INFORMATION MANAGEMENT TABLE 621

| DEVICE ID (6211) | FAILURE INFORMATION (6212) | Phy STATE (6213) |
|---|---|---|
| Expander1 | NO FAILURE | ENABLED |
| Expander2 | NO FAILURE | ENABLED |
| Expander3 | NO FAILURE | ENABLED |
| : | : | : |
| HDD1-1 | NO FAILURE | ENABLED |
| HDD1-2 | NO FAILURE | ENABLED |
| : | : | : |
| HDD2-1 | NO FAILURE | ENABLED |
| HDD2-2 | NO FAILURE | ENABLED |
| : | : | : |
| HDD3-1 | FAILURE | DISABLED |
| HDD3-2 | NO FAILURE | ENABLED |
| : | : | : |

HARDWARE CONFIGURATION OF EXPANDER

FUNCTIONS OF EXPANDER 112, 121

Fig. 10

COUPLED-DEVICE MANAGEMENT TABLE 721

| PhyID | COUPLED-DEVICE ID | COUPLED-DRIVE TYPE | Phy STATE | LOOPBACK DIAGNOSIS RESULT | SATA DEVICE VIRTUAL COUPLING FLAG |
|---|---|---|---|---|---|
| Phy2-1 | Expander1 | – | ENABLED | NORMAL | OFF |
| Phy2-2 | Expander1 | – | ENABLED | NORMAL | OFF |
| Phy2-3 | Expander1 | – | ENABLED | NORMAL | OFF |
| Phy2-4 | Expander1 | – | ENABLED | NORMAL | OFF |
| Phy2-5 | Expander3 | – | ENABLED | NORMAL | OFF |
| Phy2-6 | Expander3 | – | ENABLED | NORMAL | OFF |
| Phy2-7 | Expander3 | – | ENABLED | NORMAL | OFF |
| Phy2-8 | Expander3 | – | ENABLED | NORMAL | OFF |
| Phy2-9 | HDD2-1 | SAS | ENABLED | ERROR | OFF |
| Phy2-10 | HDD2-2 | SAS | ENABLED | ERROR | OFF |
| ⋮ | ⋮ | ⋮ | ⋮ | ⋮ | ⋮ |

DEVICE INFORMATION MANAGEMENT TABLE 621

| DEVICE ID | FAILURE INFORMATION | Phy STATE |
|---|---|---|
| Expander1 | NO FAILURE | ENABLED |
| Expander2 | NO FAILURE | ENABLED |
| Expander3 | NO FAILURE | ENABLED |
| ⋮ | ⋮ | ⋮ |
| HDD1－1 | NO FAILURE | ENABLED |
| HDD1－2 | NO FAILURE | ENABLED |
| ⋮ | ⋮ | ⋮ |
| HDD2－1 | NO FAILURE | ENABLED |
| HDD2－2 | NO FAILURE | ENABLED |
| ⋮ | ⋮ | ⋮ |
| HDD3－1 | FAILURE | DISABLED |
| HDD3－2 | NO FAILURE | ENABLED |
| ⋮ | ⋮ | ⋮ |

Columns: 6211, 6212, 6213

Fig. 15

COUPLED-DEVICE MANAGEMENT TABLE 721 (EXPANDER 1)

| PhyID | COUPLED-DEVICE ID | COUPLED-DRIVE TYPE | Phy STATE | LOOPBACK DIAGNOSIS RESULT | SATA DEVICE VIRTUAL COUPLING FLAG |
|---|---|---|---|---|---|
| Phy1-1 | Expander2 | - | ENABLED | NORMAL | OFF |
| Phy1-2 | Expander2 | - | ENABLED | NORMAL | OFF |
| Phy1-3 | Expander2 | - | ENABLED | NORMAL | OFF |
| Phy1-4 | Expander2 | - | ENABLED | NORMAL | OFF |
| Phy1-5 | HDD1－1 | - | ENABLED | NORMAL | OFF |
| Phy1-6 | HDD1－1 | - | ENABLED | NORMAL | OFF |
| ⋮ | ⋮ | ⋮ | ⋮ | ⋮ | ⋮ |

Columns: 7211, 7212, 7213, 7214, 7215, 7216

Fig. 16

COUPLED-DEVICE MANAGEMENT TABLE 721 (EXPANDER 2)

| PhyID | COUPLED -DEVICE ID | COUPLED -DRIVE TYPE | Phy STATE | LOOPBACK DIAGNOSIS RESULT | SATA DEVICE VIRTUAL COUPLING FLAG |
|---|---|---|---|---|---|
| Phy2-1 | Expander1 | – | ENABLED | NORMAL | OFF |
| Phy2-2 | Expander1 | – | ENABLED | NORMAL | OFF |
| Phy2-3 | Expander1 | – | ENABLED | NORMAL | OFF |
| Phy2-4 | Expander1 | – | ENABLED | NORMAL | OFF |
| Phy2-5 | Expander3 | – | ENABLED | NORMAL | OFF |
| Phy2-6 | Expander3 | – | ENABLED | NORMAL | OFF |
| Phy2-7 | Expander3 | – | ENABLED | NORMAL | OFF |
| Phy2-8 | Expander3 | – | ENABLED | NORMAL | OFF |
| Phy2-9 | HDD2-1 | SAS | ENABLED | ERROR | OFF |
| Phy2-10 | HDD2-2 | SAS | ENABLED | ERROR | OFF |
| ⋮ | ⋮ | ⋮ | ⋮ | ⋮ | ⋮ |

Fig. 17

COUPLED-DEVICE MANAGEMENT TABLE 721 (EXPANDER 3)

| PhyID | COUPLED -DEVICE ID | COUPLED -DRIVE TYPE | Phy STATE | LOOPBACK DIAGNOSIS RESULT | SATA DEVICE VIRTUAL COUPLING FLAG |
|---|---|---|---|---|---|
| Phy3-1 | Expander2 | – | ENABLED | NORMAL | OFF |
| Phy3-2 | Expander2 | – | ENABLED | NORMAL | OFF |
| Phy3-3 | Expander2 | – | ENABLED | NORMAL | OFF |
| Phy3-4 | Expander2 | – | ENABLED | NORMAL | OFF |
| ⋮ | ⋮ | ⋮ | ⋮ | ⋮ | ⋮ |
| Phy3-9 | HDD3-1 | SAS | ENABLED | ERROR | OFF |
| Phy3-10 | HDD3-2 | SAS | ENABLED | ERROR | OFF |
| ⋮ | ⋮ | ⋮ | ⋮ | ⋮ | ⋮ |

STORAGE APPARATUS AND METHOD FOR CONTROLLING THE SAME USING LOOPBACK DIAGNOSIS TO DETECT FAILURE

TECHNICAL FIELD

The present invention relates to a storage apparatus and a method for controlling the storage apparatus, and particularly to a technique for accurately locating a failure site upon occurrence of a failure.

BACKGROUND ART

Patent Literature (PTL) 1 discloses a configuration related to a storage system having multiple SAS (Serial Attached SCSI) expanders that serve as interfaces for coupling hard disk drives and that are cascade-coupled to a storage controller. This configuration aims to obtain extensibility and high availability.

PTL 2 discloses a computer system that includes a computer, a first storage device coupled to the computer, and a second storage device externally coupled to the first storage device. The first storage device provides a first storage area to the computer, and the second storage device includes a second storage area corresponding to the first storage area. To prevent operations from stopping due to a path failure, this computer system determines whether or not a failure has occurred in at least one of first to fourth paths; selects a path used for access to the first storage area or the second storage area, based on a result of the determination; and sends, through the selected path, a request to access the first storage area or the second storage area.

CITATION LIST

Patent Literature

PTL 1: Japanese Patent Application Publication No. 2009-211140
PTL 2: Japanese Patent Application Publication No. 2009-259031

SUMMARY OF INVENTION

Technical Problem

For a storage system in which hard disk drives are coupled to a storage controller via cascade-coupled expanders, a loopback diagnosis is known as a method for locating a failure site upon occurrence of a failure. In the loopback diagnosis, the storage controller sends a data frame and refers to a response to the data frame.

This loopback diagnosis involving data frame transmission, however, cannot determine the presence or absence of a failure in hardware or software that performs, for example, processing of a connection frame for the expanders. Accordingly, upon occurrence of a failure, not only a failure site but also a normal site needs to be stopped or disabled, which may unnecessarily expand the influence of the failure. Moreover, some of the expanders have a function that is not activated unless devices are actually coupled to communication ports of the expanders. When no device is coupled to the communication port, a failure related to such function cannot be detected.

The present invention has been made in consideration of such circumstances, and has an objective to provide a storage apparatus and a method for controlling the storage apparatus which are capable of accurately locating a failure site upon occurrence of a failure.

Solution to Problem

In order to achieve the above objective, one aspect of the present invention is to provide a storage apparatus comprising: a controller that writes data into or reads data from a storage drive in response to a data input-output request sent from an external device; and at least one expander that includes a switch circuit having at least one physical port, the controller and the storage drive being communicatively coupled to each other through the switch circuit, wherein the controller performs a loopback diagnosis on the expander, the controller performs a connection-based diagnosis on a target device by sending the target device a connection frame, the target device being a device detected as having a failure as a result of the loopback diagnosis, and when a response to the connection frame includes information indicating a failure, the controller disables the physical port to which the target device is coupled, or the physical port of the switch circuit existing on a path from the controller to the target device.

Other problems and how to solve them, disclosed by the present application, will become apparent through embodiments of the present invention given below and the attached drawings.

Advantageous Effects of Invention

Accordingly to the present invention, a failure site can be located accurately when a failure occurs in a storage apparatus.

BRIEF DESCRIPTION OF DRAWINGS

FIG. 6 is a diagram showing functions of and data managed by a failure monitor 1113.
FIG. 7 is a diagram showing a device information management table 621.
FIG. 10 is a diagram showing a coupled-device management table 721.
FIG. 14 is an example of the device information management table 621 held by the controller 11.
FIG. 15 is an example of the coupled-device management table 721 held by "Expander 1."

FIG. 16 is an example of the coupled-device management table 721 held by "Expander 2."

FIG. 17 is an example of the coupled-device management table 721 held by "Expander 3."

DESCRIPTION OF EMBODIMENTS

Embodiments will be described below.

First Embodiment

Figure 1:
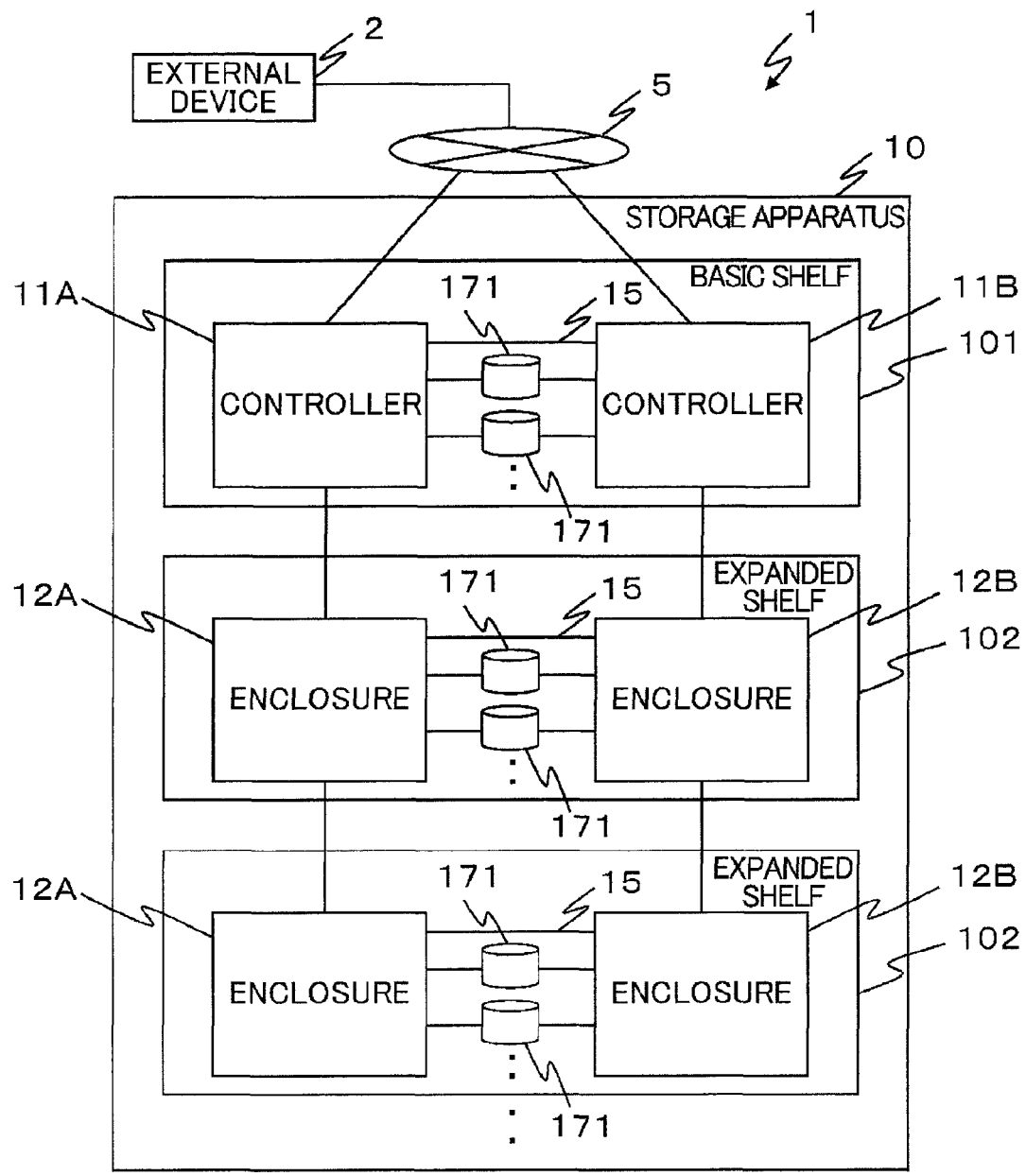
FIG. 1 is a diagram showing a schematic configuration of a storage system 1.

FIG. 1 shows a schematic configuration of a storage system 1 described as a first embodiment. As shown in the drawing, the storage system 1 includes a storage apparatus 10, at least one external device 2 (host devices) communicatively coupled to the storage apparatus 10 through a communication network 5.

For example, the communication network 5 is a LAN (Local Area Network), a SAN (Storage Area Network), the Internet, a public communication network, or the like. Communication between the external device 2 and the storage apparatus 10 is carried out using a protocol such as TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark), for example.

The external device 2 is an information apparatus (computer) that uses a storage area provided by the storage apparatus 10 as a storage location for data. For example, the external device 2 is a personal computer, a mainframe computer, an office computer, or the like. To gain access to the storage area, the external device 2 sends a data input/output request (called a data I/O request below) to the storage apparatus 10.

The storage apparatus 10 includes a basic shelf 101 and at least one expanded shelf 102 that are cascade-coupled to the basic shelf 101. Among these, the basic shelf 101 includes two controllers 11A, 11B and at least one storage drive 171 that is communicatively coupled to the controllers 11A, 11B. The controllers 11A, 11B are communicatively coupled to each other through a communication line 15 such as a bus.

The controllers 11A, 11B and the storage drives 171 are unitized, and are inserted into and withdrawn from the basic shelf 101 by being pushed or pulled through a mounting slot provided to the basic shelf 101. The basic shelf 101 has various other devices that are not shown, including a cooling device (such as a cooling fan) for cooling heat-generating components such as the storage drives 171, and a power supply device for driving the controllers 11A, 11B, the storage drives 171, the cooling device, and the like.

The expanded shelf 102 includes two enclosures 12A, 12B and at least one storage drive 171 that is communicatively coupled to the enclosures 12A, 12B. The enclosures 12A, 12B are coupled to each other through a communication line 15 such as a bus. The enclosures 12A, 12B are unitized, and are inserted into and withdrawn from the expanded shelf 102 by being pushed or pulled through a mounting slot provided to the expanded shelf 102. The expanded shelf 102 has various other devices that are not shown, including a cooling device (such as a cooling fan) for cooling heat-generating components such as the storage drives 171, and a power supply device for driving the storage drives 171, the cooling device, and the like.

The storage drive 171 provided to either the basic shelf 101 or the expanded shelf 102 is a hard disk drive of a type such as SAS (Serial Attached SCSI), SATA (Serial ATA), FC (Fibre Channel), PATA (Parallel ATA), or SCSI (Small Computer System Interface), or a semiconductor storage device (SSD; Solid State Drive).

Figure 2:
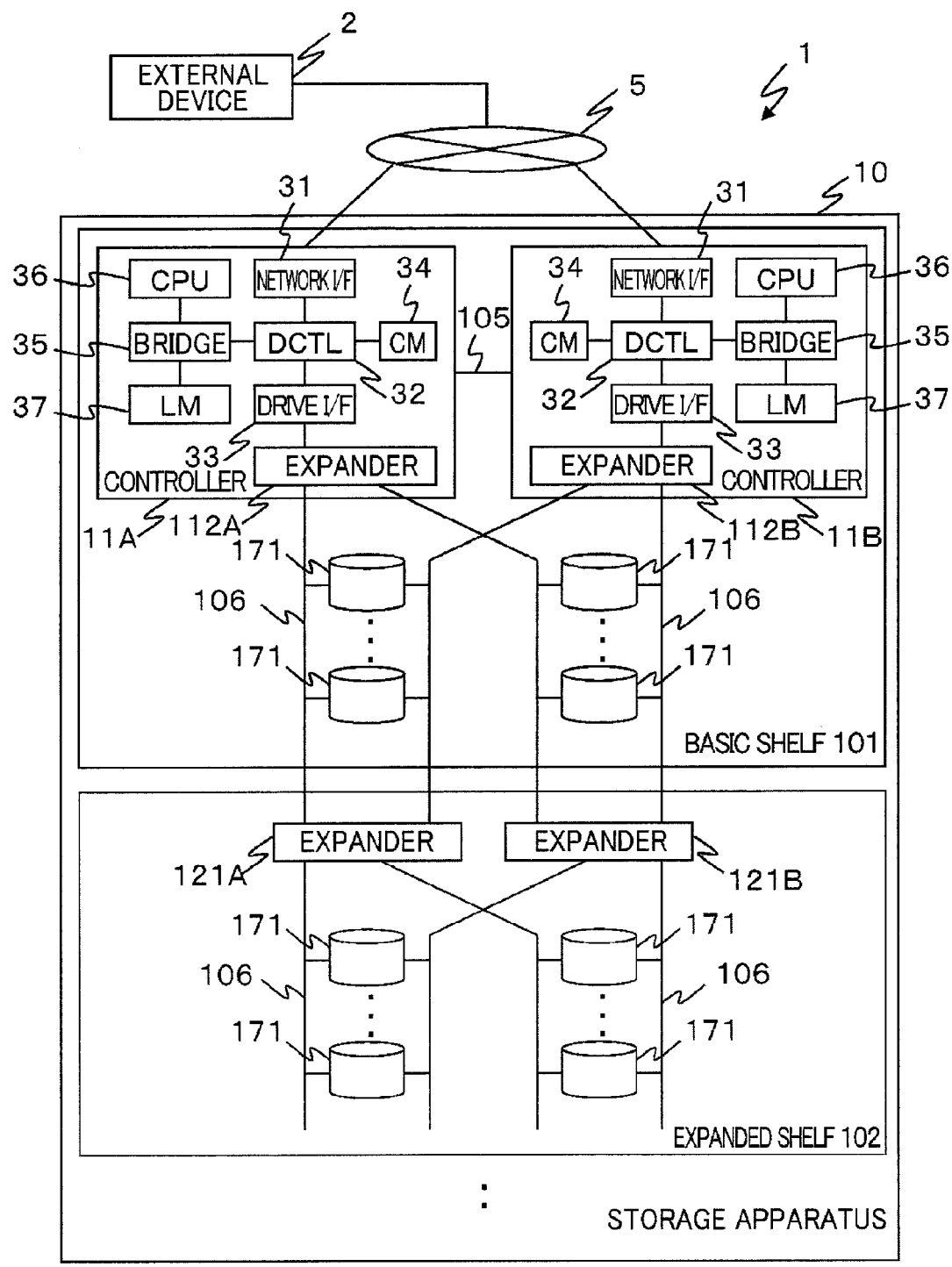
FIG. 2 is a diagram showing a hardware configuration of a storage apparatus 10.

FIG. 2 shows a hardware configuration of the storage apparatus 10. As shown in the drawing, the controllers 11A, 11B of the basic shelf 101 include network I/Fs 31A, 31B, data controllers 32A, 32B (DCTL), drive I/Fs 33A, 33B (storage medium controllers), cache memories 34A, 34B (CM), bridges 35A, 35B, CPUs 36A, 36B, local memories 37A, 37B (LM), and expanders 112A, 112B, respectively. Note that the two controllers 11A, 11B share part or all of the storage area of the cache memory 34A (or the cache memory 34B) so that one of the cache memories can take over information held by the other one to fail-over or balance the load when a failure occurs in one of the controllers 11A, 11B or when one of them experiences overload.

The expanded shelf 102 includes expanders 121A, 121B. The storage drives 171 provided to the basic shelf 101 and the expanded shelf 102 are coupled to one another communicatively through a Fibre Channel loop 106 formed by the expanders 112A, 112B, 121A, 121B. Note that, although the following description is given assuming that the Fibre Channel loop 106 is communication means used between the controllers 11A, 11B and the storage drives 171, the communication means between the controllers 11A, 11B and the storage drives 171 is not necessarily limited to the Fibre Channel loop 106.

Figure 3:
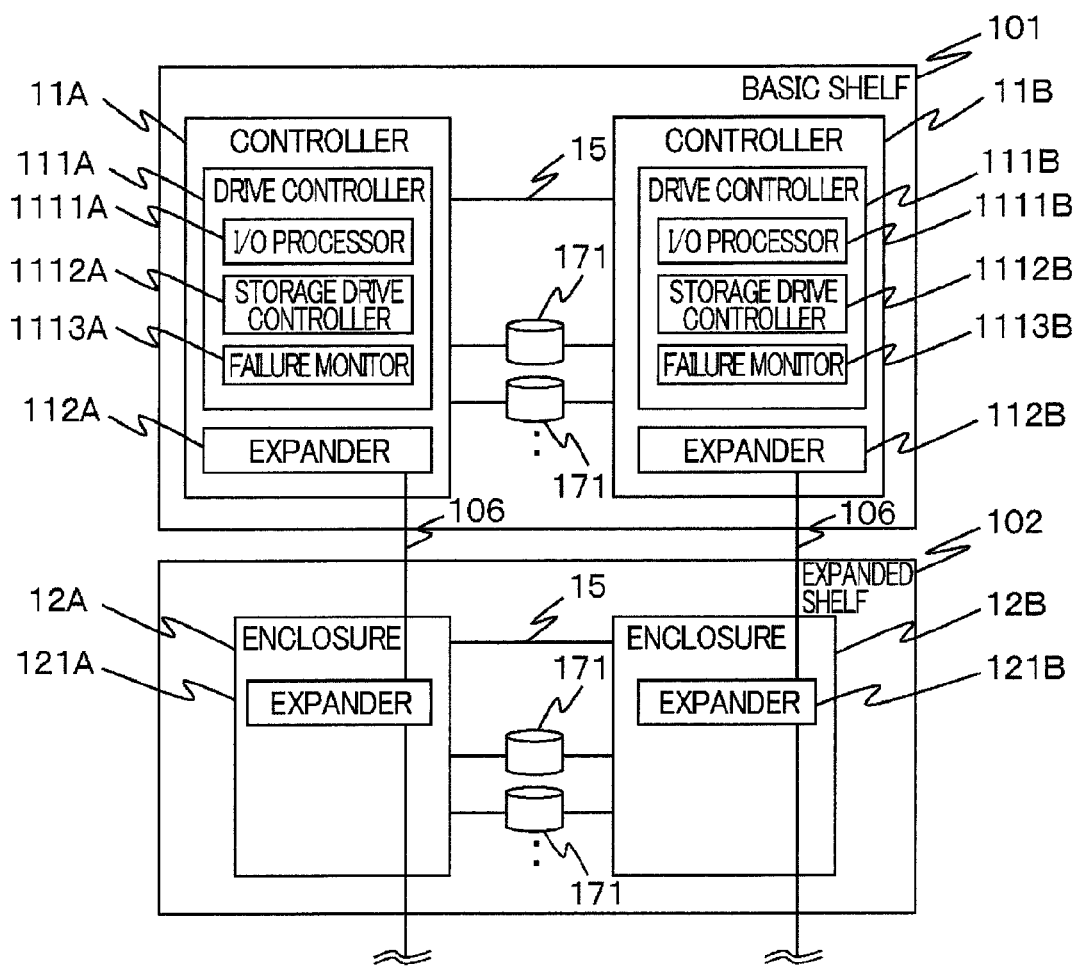
FIG. 3 is a diagram showing main functions of a controller 11 and an enclosure 12.

FIG. 3 shows main functions of the controller 11 (11A, 11B) and the enclosure 12 (12A, 12B). In the following description, components that have common functions and are denoted by the same number followed by A and B, respectively, are simply referred to by that number with no "A" and "B". For example, the computers 11A and 11B are referred to simply as the computer 11.

A drive controller 111 of the controller 11 includes functions of an I/O processor 1111, a storage drive controller 1112, and a failure monitor 1113. Note that the functions of the drive controller 111 are implemented when the CPU 36 reads and executes a program stored in the local memory 37 of the controller 11.

The I/O processor 1111 performs control on communications between the storage apparatus 10 and the external device 2, mainly regarding a data transfer protocol. Upon receipt of a data I/O request (such as a data write request and a data read request) sent from the external device 2, the I/O processor 1111 sends a request to access the storage drive 171 to the expander 112, 121. The I/O processor 1111 then sends the external device 2 a response indicating processing executed in response to the data I/O request (such as read data, a read completion report, or a write completion report).

The processing executed by the I/O processor 1111 in response to the data I/O request is as follows. For example, when the request calls for data reading from the storage drive 171 (called read data below), the I/O processor 1111 reads data from the storage drive 171 into the cache memory 34 (CM) (staging). When the request calls for data writing into the storage drive 171 (called write data below), the I/O processor 1111 writes data acquired from the cache memory 34 (CM) into the storage drive 171 (destaging). In addition, the I/O processor 1111 sends the expander 112, 121 a request to access the storage drive 171 (called a drive access request below), and receives a response sent by the expander 112, 121 in response to the drive access request (such as data read from the storage drive 171, a report indicating that reading from the storage drive 171 is complete, or a report indicating that writing into the storage drive 171 is complete).

The storage drive controller 1112 of the drive controller 111 performs: control of the storage drives 171 (control on a Redundant Arrays of Inexpensive (or Independent) Disks (RAID) scheme (RAID 0 to 6); management of configuration information on the storage drives 171 (management of coupling states of the storage drives 171 and management of RAID configuration information); and the like.

The failure monitor 1113 of the drive controller 111 performs processing such as monitoring a failure and responding to the failure of the expander 112 of the controller 11 of the basic shelf 101, the expander 121 of the enclosure 12 of the expanded shelf 102, the storage drives 171 coupled to the basic shelf 101 and the expanded shelf 102, and the like.

The expander 112, 121 functions as an intermediary device (data transfer switch) implementing interconnections between the drive controller 111 of the controller 11 and the storage drives 171. The expander 112, 121 acts as a device extension switch for communicatively connecting the multiple storage drives 171 to one another. The expander 112, 121 serves as an initiator or a target as in a protocol such as SMP (Serial Management Protocol), SSP (Serial SCSI Protocol), or STP (Serial ATA Tunneling Protocol). The expander 112, 121 forms a tree network topology having, for example, the drive controller 111 of the controller 11 as a root.

Figure 4:
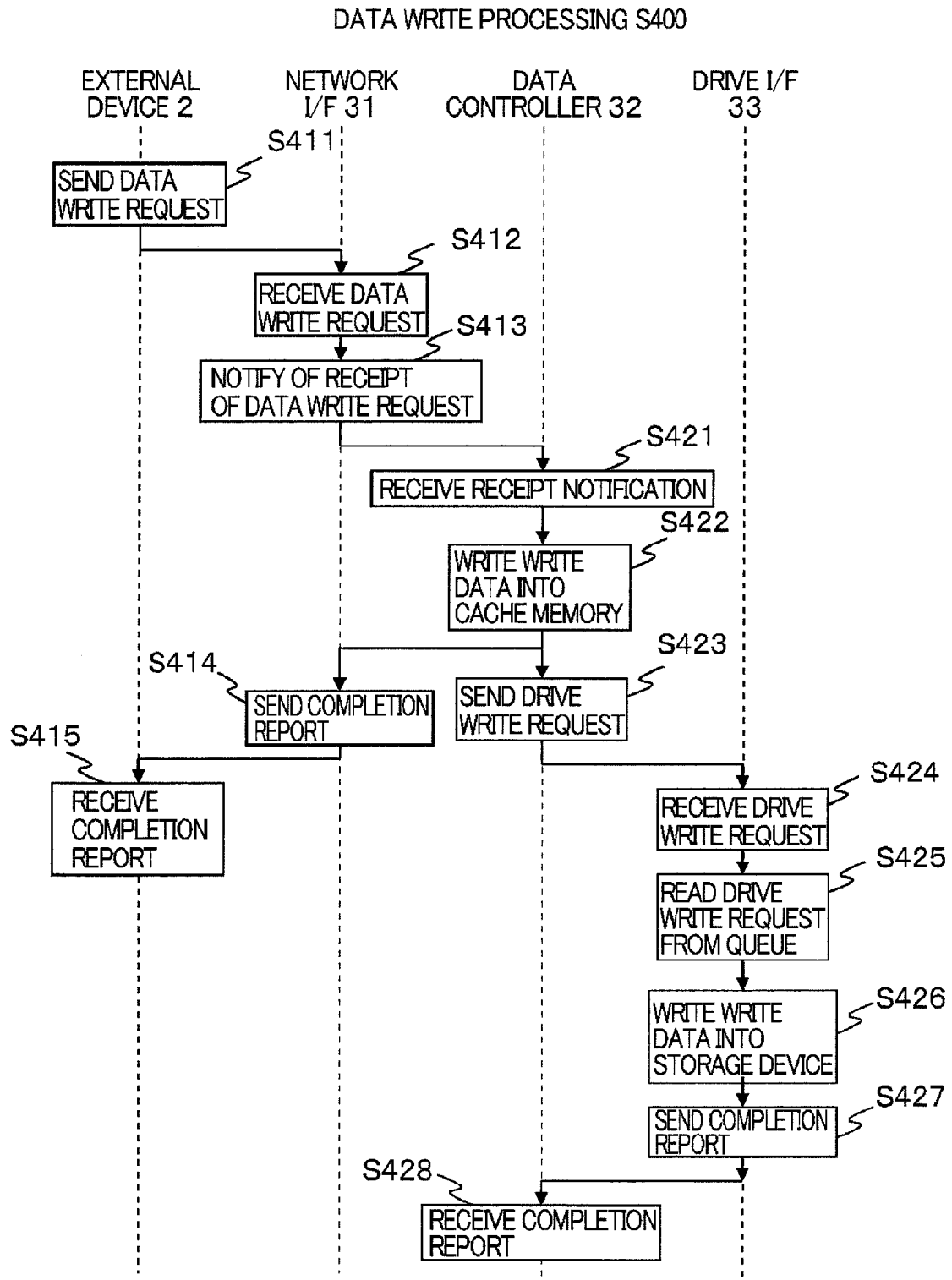
FIG. 4 is a diagram illustrating basic operations of the storage apparatus 10.

FIG. 4 is a diagram illustrating basic operations of the storage apparatus 10, and is a flowchart illustrating processing performed by the I/O processor 1111 when the storage apparatus 10 receives a frame including a data write request from the external device 2 (called data write processing S400 below). The data write processing S400 is described below with the drawing. Note that, in the following descriptions, an "S" before each reference numeral means a step.

The external device 2 sends a frame, and the network I/F 31 of the storage apparatus 10 receives the frame (S411, S442). Upon receipt of the frame, the network I/F 31 notifies the data controller 32 of the frame receipt (S413).

Upon receipt of the notification from the network I/F 31 (S421), the data controller 32 generates a drive write request based on the data write request in the frame, and stores the generated write data in the cache memory 34. Then, the data controller 32 sends the generated drive write request to the drive I/F 33 (S422, S423). The network I/F 31 sends a completion report to the external device 2 (S414), and the external device 2 receives the completion report (S415).

Upon receipt of the drive write request, the drive I/F 33 registers the drive write request thus received, in a write processing queue (not shown) (S424). The drive I/F 33 reads the drive write request from the write processing queue as appropriate (S425). From the cache memory 34, the drive I/F 33 reads write data designated by the drive write request thus read out, and writes the write data thus read, into the storage drive 171 (S426).

Next, the drive I/F 33 notifies the data controller 32 of a report indicating that a write of the write data requested by the drive write request has been completed (completion report) (S427), and the data controller 32 receives the completion report thus sent (S428).

Figure 5:
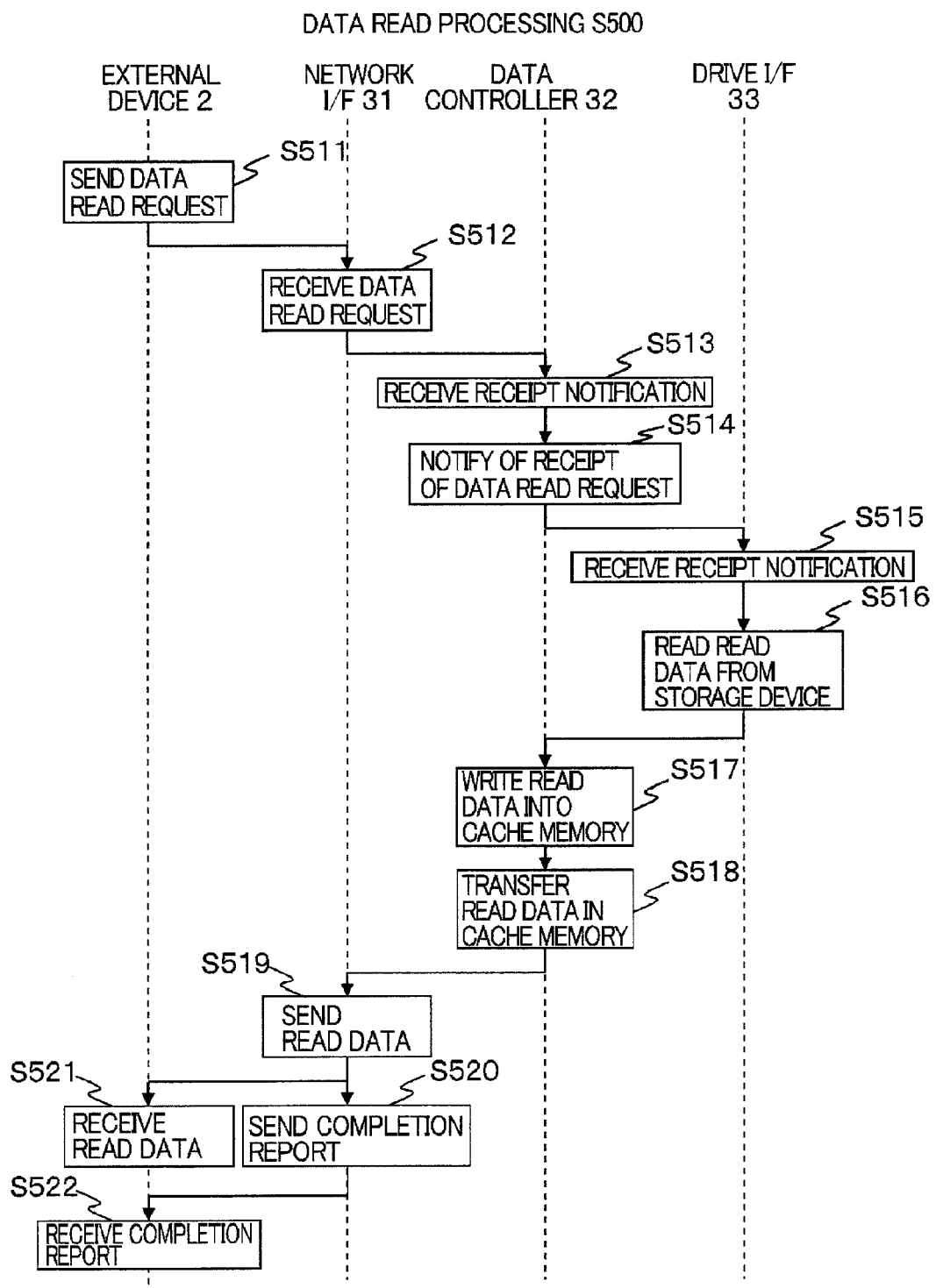
FIG. 5 is a diagram illustrating basic operations of the storage apparatus 10.

FIG. 5 is a diagram illustrating basic operations of the storage apparatus 10, and is a flowchart illustrating I/O processing performed by the I/O processor 1111 of the storage apparatus 10 when the storage apparatus 10 receives a frame including a data read request from the external device 2 (called data read processing S500 below). The data read processing S500 is described below with the drawing.

The external device 2 sends a frame, and the network I/F 31 of the storage apparatus 10 receives the frame (S511, S512). Upon receipt of the frame from the external device 2, the network I/F 31 notifies the data controller 32 of the frame receipt (S513). Upon receipt of the frame receipt notification, the data controller 32 notifies the drive I/F 33 of the frame receipt (S514).

Upon receipt of the notification from the network I/F 31 (S515), the drive I/F 33 reads, from a storage device 17 (the storage drive 171), data designated by the data read request included in the frame (designated for example with an LBA (Logical Block Address)) (S516). Note that the processing of reading from the storage device 17 (S516) is usually omitted if the read data is in the cache memory 34 (cache hit). The data controller 32 writes the data read by the drive I/F 33 into the cache memory 34 (S517). The data controller 32 transfers the data written in the cache memory 34 to the network I/F 31 as appropriate (S518).

The network I/F 31 sequentially sends the external device 2 the read data sent from the data controller 32 (S519). Upon completion of the read data transmission, the network I/F 31 sends the external device 2 a completion report (S520), and the external device 2 receives the read data and the completion report thus sent (S521, S522).

FIG. 6 shows main functions of the failure monitor 1113 and data managed by the failure monitor 1113. As shown in the drawing, the failure monitor 1113 includes functions of a broadcast processor 611, a discover processor 612, a loopback diagnosis processor 613, and a virtual coupling setting processor 614. In addition, the failure monitor 1113 manages (stores) a device information management table 621.

Among these functions, upon receipt of a broadcast frame sent by a Phy 1121 of the expander 112, 121, the broadcast processor 611 notifies the discover processor 612 of the receipt.

Upon receipt of the notification from the broadcast processor 611, the discover processor 612 sends a discover command to a communication path connecting the controller 11, expanders 112, 121, and the storage drives 171.

The discover command is a command issued to acquire information indicating a configuration or state of the expander 112, 121, information indicating what kind of device is currently coupled to each Phy 1121 of the expander 112, 121, and information indicating a state of the coupled device (such as whether a failure exists or not) and indicating a communication state of the coupled device (such as whether a link error exists or not) (these pieces of information are collectively called configuration information below). Concrete examples of the discover command include "Discover" issued by SMP described above, "SSP Discover Extended" issued by SSP, and the like. The discover processor 612 updates, as appropriate, the contents of the device information management table 621 based on the configuration information returned by the expanders 112, 121 in response to the discover command.

The loopback diagnosis processor 613 sends the expander 112, 121 a loopback diagnosis command instructing execution of a loopback test. Examples of the loopback command include "SAS Buffer Loopback" and the like. For example, the loopback diagnosis processor 613 sends a loopback diagnosis command when the configuration information that the discover processor 612 receives from the expander 112, 121 includes information indicating a communication error.

The virtual coupling setting processor 614 sets "ON" or "OFF" a SATA device virtual coupling flag 7216 in a coupled-device management table 721 to be described later, and thus controls activation/deactivation of a function of an STP/SATA bridge 714.

What is managed in the device information management table 621 is information on the expanders 112, 121 and on a device (e.g., the storage drive 171) currently coupled to each Phy 1121 of the expanders 112, 121. The discover processor 612 updates the contents of the device information management table 621 based on the configuration information notified of by the expanders 112, 121 in response to the discover command.

FIG. 7 shows an example of the device information management table 621 managed by the failure monitor 1113. As shown in the drawing, the device information management table 621 has one or more records each including items of a device ID 6211, failure information 6212, and a Phy state 6213.

An identifier of the expander 112, 121 or an identifier of a device (e.g., the storage drive 171) coupled to the Phy 1121 of the expander 112, 121 (called a device ID below) is set in the device ID 6211. Information indicating whether a corresponding device has a failure or not (failure/no failure) is set in the failure information 6212. Information indicating a state of the Phy 1121 of the expander 112, 121 (enabled/disabled) is set in the Phy state 6213.

Figure 8:
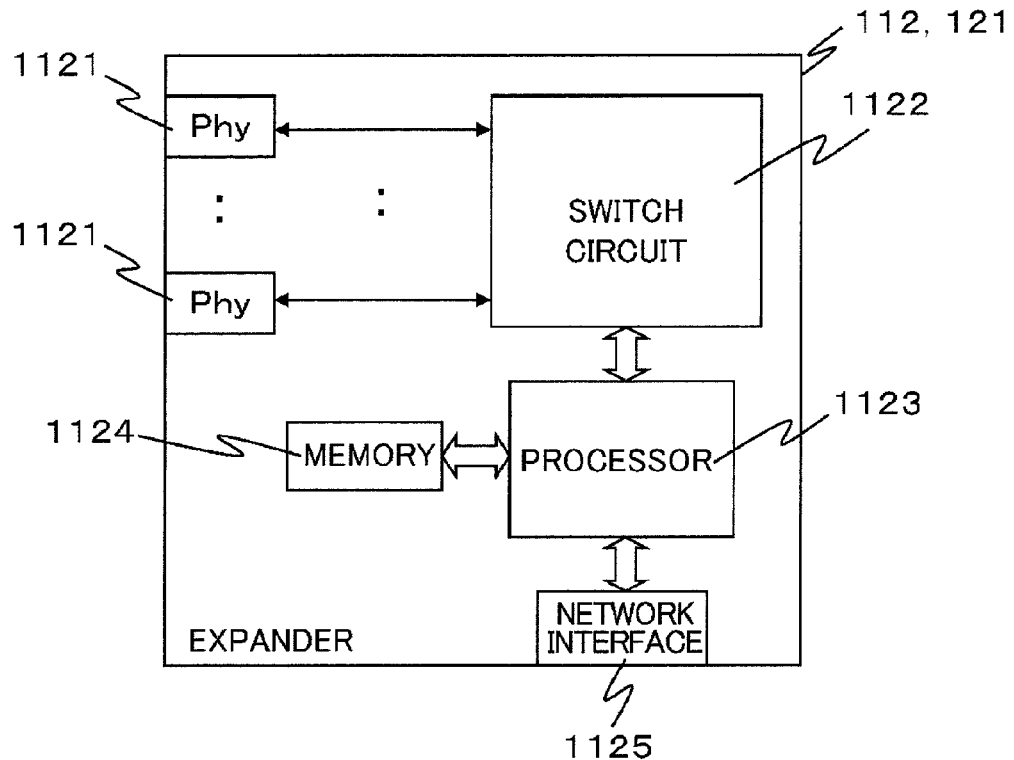
FIG. 8 is a diagram showing a hardware configuration of an expander 112, 121.

FIG. 8 shows a hardware configuration of the expander 112, 121. As shown in the drawing, the expander 112, 121 includes multiple communication ports (called Phy 1121 below), a switch circuit 1122, a processor 1123, a memory 1124, and a network interface 1125.

Each Phy 1121 shown in the drawing includes a serial-parallel conversion circuit such as a SerDes (Serializer/Deserializer). The switch circuit 1122 includes an ECR (Expander Connection Router) that controls data transfer between the Phy ports 1121 according to routing and zoning settings stored in the memory 1124, an ECM (Expander Connection Manager) that performs routing and zoning settings, a BPP (Broadcast Primitive Processor), and the like.

The BPP monitors the switch circuit 1122 and devices coupled to the switch circuit 1122 and a change in their communication states, such as whether the storage drive 171 coupled to the Phy 1121 is inserted or withdrawn, whether a link is established or not (linkup/linkdown), and whether there is a communication failure or not. In addition, upon detection of the change in state, the BPP sends a broadcast frame from the Phy 1121.

Figure 9:
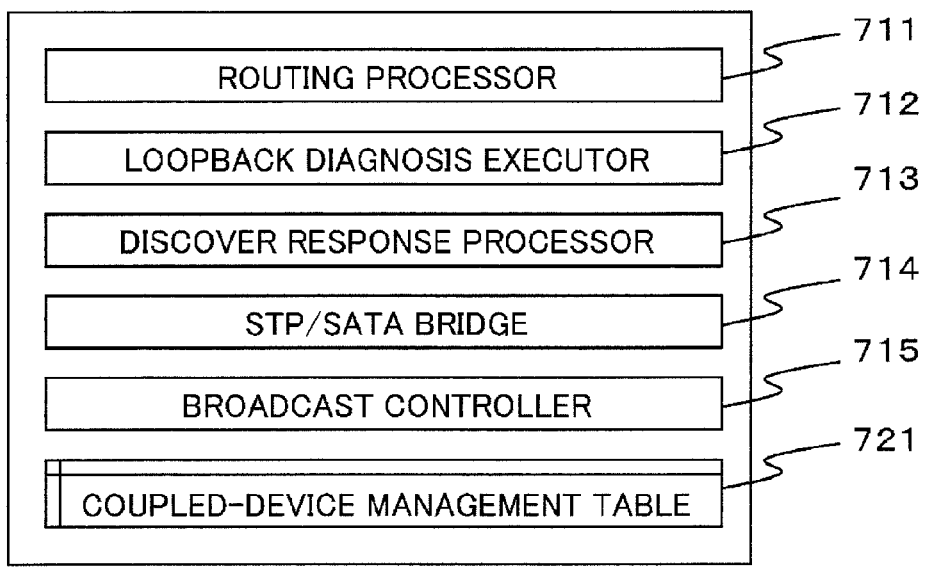
FIG. 9 is a diagram showing main functions of and data managed by the expander 112, 121.

FIG. 9 shows main functions of the expander 112, 121 and data managed by the expander 112, 121. As shown in the drawing, the expander 112, 121 includes functions of a routing processor 711, a loopback diagnosis executor 712, a discover response processor 713, the STP/SATA bridge 714, and a broadcast controller 715. Moreover, the expander 112, 121 manages (stores) the coupled-device management table 721.

The routing processor 711 performs control of data transfer between the Phy ports 1121 (routing control) according to the setting information on routing and zoning. The function of the routing processor 711 is implemented by, for example, the ECR and ECM described above.

The loopback diagnosis executor 712 executes a loopback diagnosis in response to a loopback diagnosis command sent from the controller 11, and sends the controller 11 a result of the loopback diagnosis. Moreover, as will be described later, when finding a error of a predetermined type as a result of the loop diagnosis, the loopback diagnosis executor 712 disables the concerning Phy 1121 of the expander 112, 121. The function of the loopback diagnosis executor 712 is implemented by hardware of the expander 112, 121, or when the processor 1123 of the expander 112, 121 reads and executes a program stored in the memory 1124.

Upon receipt of a discover command, the discover response processor 713 sends the controller 11 the aforementioned configuration information. The function of the discover response processor 713 is implemented by hardware of the expander 112, 121, or when the processor 1123 of the expander 112, 121 reads and executes a program stored in the memory 1124.

The STP/SATA bridge 714 functions as a protocol conversion layer between the storage drive 171 according to the SATA standards (called a "SATA device" below) and the storage device 171 according to the SAS standards (called a "SAS device" below). Note that the STP/SATA bridge 714 does not allow parallel access from multiple initiators (does not support multi-initiator access) and performs exclusive access control by maintaining affiliation while a session is established. The function of the STP/SATA bridge 714 is implemented by hardware of the expander 112, 121, or when the processor 1123 of the expander 112, 121 reads and executes a program stored in the memory 1124.

The STP/SATA bridge 714 includes a function that gives a SAS identifier to a SATA device newly coupled to the Phy 1121 so that the controller 11 can access the SATA device as a SAS device (called a virtual coupling function below).

The STP/SATA bridge 714 suspends the virtual coupling function while no SATA device is coupled to the Phy 1121, and automatically starts the virtual coupling function when detecting that a SATA device is coupled to the Phy 1121. Moreover, the STP/SATA bridge 714 frequently refers to the content of the SATA device virtual coupling flag 7216 to be described later, and when detecting that "ON" is set in the SATA device virtual coupling flag 7216, starts the virtual coupling function, regardless of whether a SATA device is coupled to the Phy 1121 or not.

The broadcast controller 715 monitors a change in the state of each Phy 1121, such as whether the storage drive 171 coupled to the Phy 1121 is inserted or withdrawn, whether a link is established or not (linkup/linkdown), and whether there is a communication failure or not. Upon detection of the change in state, the broadcast controller 715 sends a broadcast frame from the Phy 1121. The function of the broadcast controller 715 is implemented by the aforementioned BPP, or when the processor 1123 reads and executes a program stored in the memory 1124.

FIG. 10 shows an example of the coupled-device management table 721. The coupled-device management table 721 manages information on each Phy 1121 of the expanders 112, 121. As shown in the drawing, the coupled-device management table 721 has one or more records each including items of a Phy ID 7211, a coupled-device ID 7212, a coupled-device type 7213, a Phy state 7214, a loopback diagnosis result 7215, and the SATA device virtual coupling flag 7216.

An identifier of the Phy of the expander 112, 121 (called a Phy ID below) is set in the Phy ID 7211. A device ID of a device (e.g., the storage drive 171) coupled to a corresponding Phy 1121 is set in the coupled-device ID 7212.

Information indicating the type of a device coupled to a corresponding Phy 1121 is set in the coupled-device type 7213. For example, "SAS" is set in the coupled-device type 7213 when a hard disk drive in compliance with SAS is coupled, and "SATA" is set in the coupled-device type 7213 when a hard disk drive in compliance with SATA is coupled.

Information indicating a current state of the Phy 1121 (enabled/disabled) is set in the Phy state 7214. A result of the loopback diagnosis performed by the loopback diagnosis executor 712 (normal/error) is set in the loopback diagnosis result 7215. A flag controlling whether to forcibly activate the STP/SATA bridge 714 or not is set in the SATA device virtual coupling flag 7216. "ON" is set to forcibly activate the STP/SATA bridge 714, and "OFF" is set otherwise.

Next, a description is given of processing performed between the drive controller 111 of the controller 11 and the expander 112, 121 upon occurrence of a failure related to the storage drive 171. Note that this failure causes the aforementioned broadcast frame to be sent, and is, for example, a failure of the storage drive 171, a failure of a communication path between the storage drive 171 and the Phy 1121 to which the storage drive 171 is coupled, a failure of the expander 112, 121 to which the storage drive 171 is coupled, or other failures.

Figure 11:
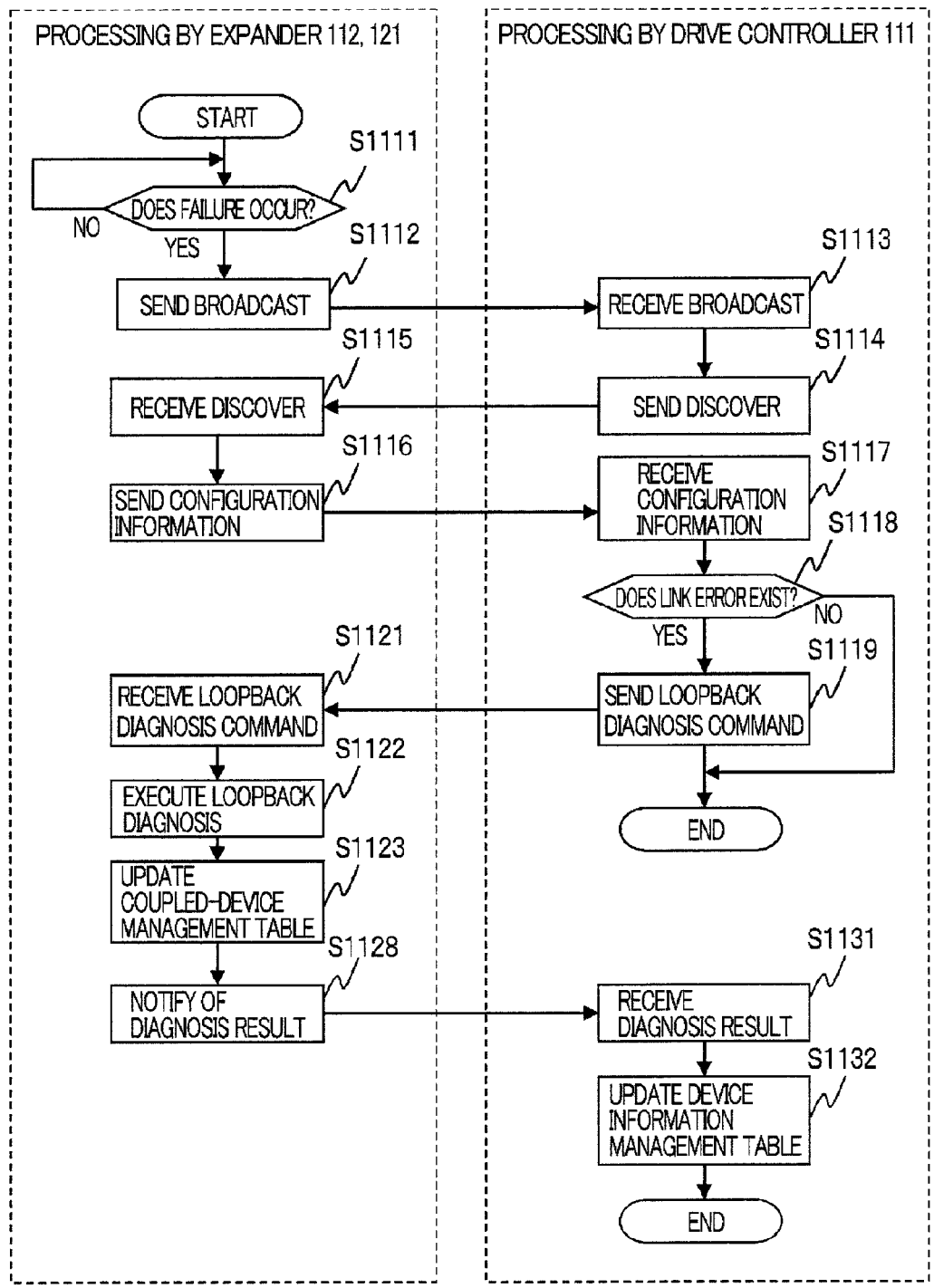
FIG. 11 is a flowchart illustrating loopback diagnosis processing S1100.

FIG. 11 is a flowchart illustrating processing performed by the drive controller 111 or the expander 112, 121 upon occurrence of a failure related to the storage drive 171 (called loopback diagnosis processing S1100 below). Note that, in the following descriptions, an "S" before each reference numeral means a step. The loopback diagnosis processing S1100 is described below with the drawing.

The expander 112, 121 constantly monitors whether a failure related to the storage drive 171 has occurred or not (S1111). Upon detection of occurrence of a failure (S1111: YES), the expander 112, 121 sends a broadcast frame from the Phy 1121 (S1112).

The drive controller 111 of the controller 11 receives the broadcast frame from the expander 112, 121 (S1113), and then sends a discover command (S1114). The expander 112, 121 receives the discover command (S1115), and then sends the aforementioned configuration information to the drive controller 111 (S1116). The drive controller 111 receives the configuration information thus sent (S1117). As described, upon receipt of a broadcast frame, the drive controller 111 sends a discover command.

Next, the drive controller 111 determines whether the configuration information thus received includes information indicating a link failure of the Phy 1121 (e.g., a failure of a link between Fibre Channel ports) (S1118). When the received configuration information does not include information indicating link failure of the Phy 1121 (S1118: NO), processing ends. On the other hand, when the received configuration information includes information indicating a link failure of the Phy 1121 (S1118: YES), the drive controller 111 sends a loopback diagnosis command to the expander 112, 121 that has sent that configuration information (S1119).

Upon receipt of the loopback diagnosis command (S1121), the expander 112, 121 executes a loopback diagnosis for the Phy 1121 in which a link failure is occurring (S1122), and reflects a diagnosis result in the coupled-device management table 721 (S1123).

Subsequently, the expander 112, 121 sends the diagnosis result to the controller 11 (S1128). The drive controller 111 receives the diagnosis result (S1131), and then reflects content of the result in the device information management table 621 (S1132).

This is a connectionless diagnosis in which a diagnosis is performed with no connection being established between the Phy ports 1121 or between the Phy 1121 and a device coupled to the Phy 1121. Accordingly, this diagnosis is incapable of detecting a failure that occurs in establishing a connection, and thus of accurately locating a site having such failure. For this reason, the storage apparatus 10 of the present embodiment further performs processing to be described below so as to be able to locate a failure site with high accuracy (called connection-based diagnosis processing S1200).

Figure 12:
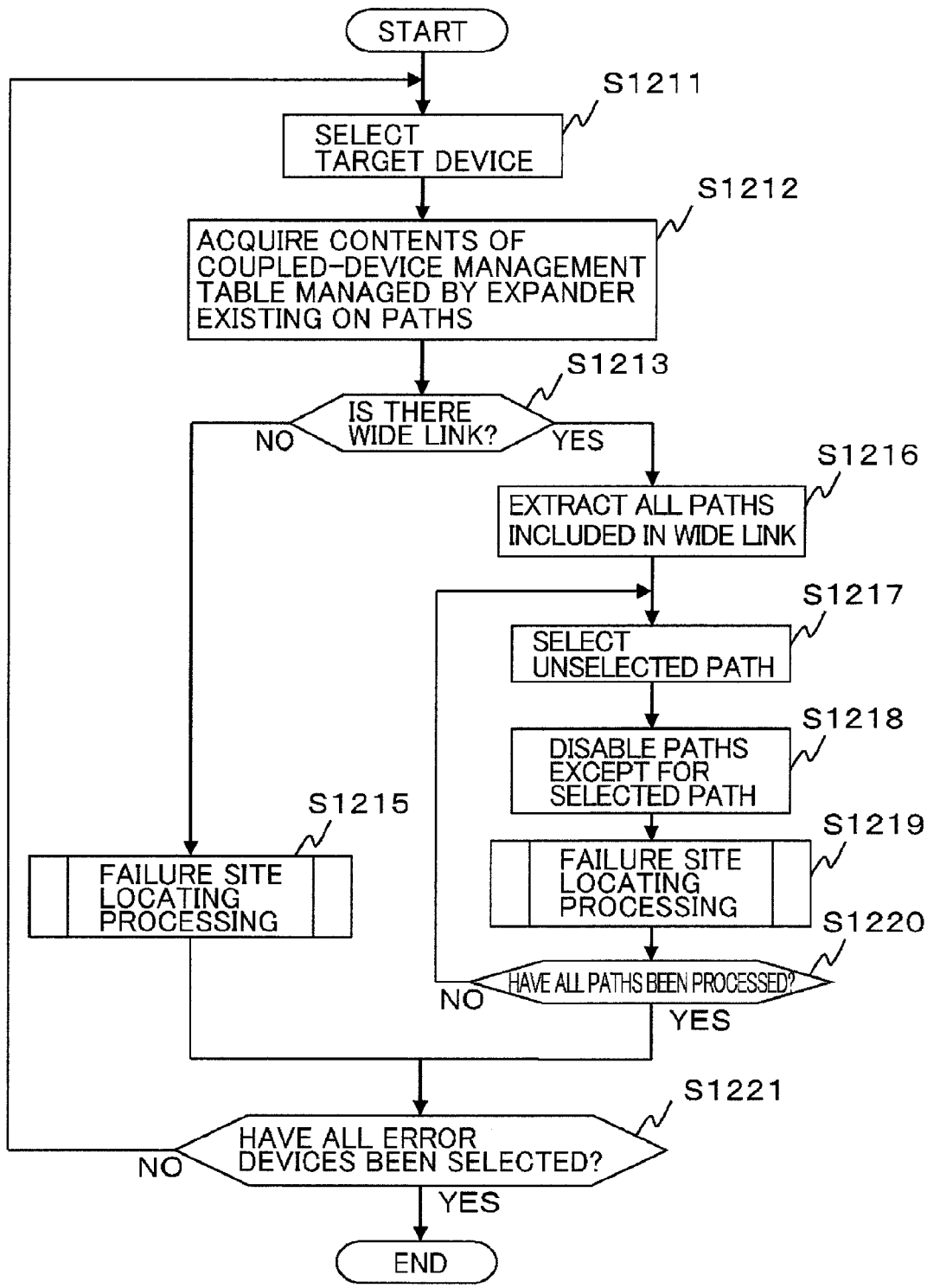
FIG. 12 is a flowchart illustrating connection-based diagnosis processing S1200.

FIG. 12 is a flowchart illustrating the connection-based diagnosis processing S1200. The connection-based diagnosis processing S1200 is described below with the drawing. For example, the connection diagnosis processing S1200 is automatically started and executed after the loopback diagnosis processing S1100.

Figure 13:
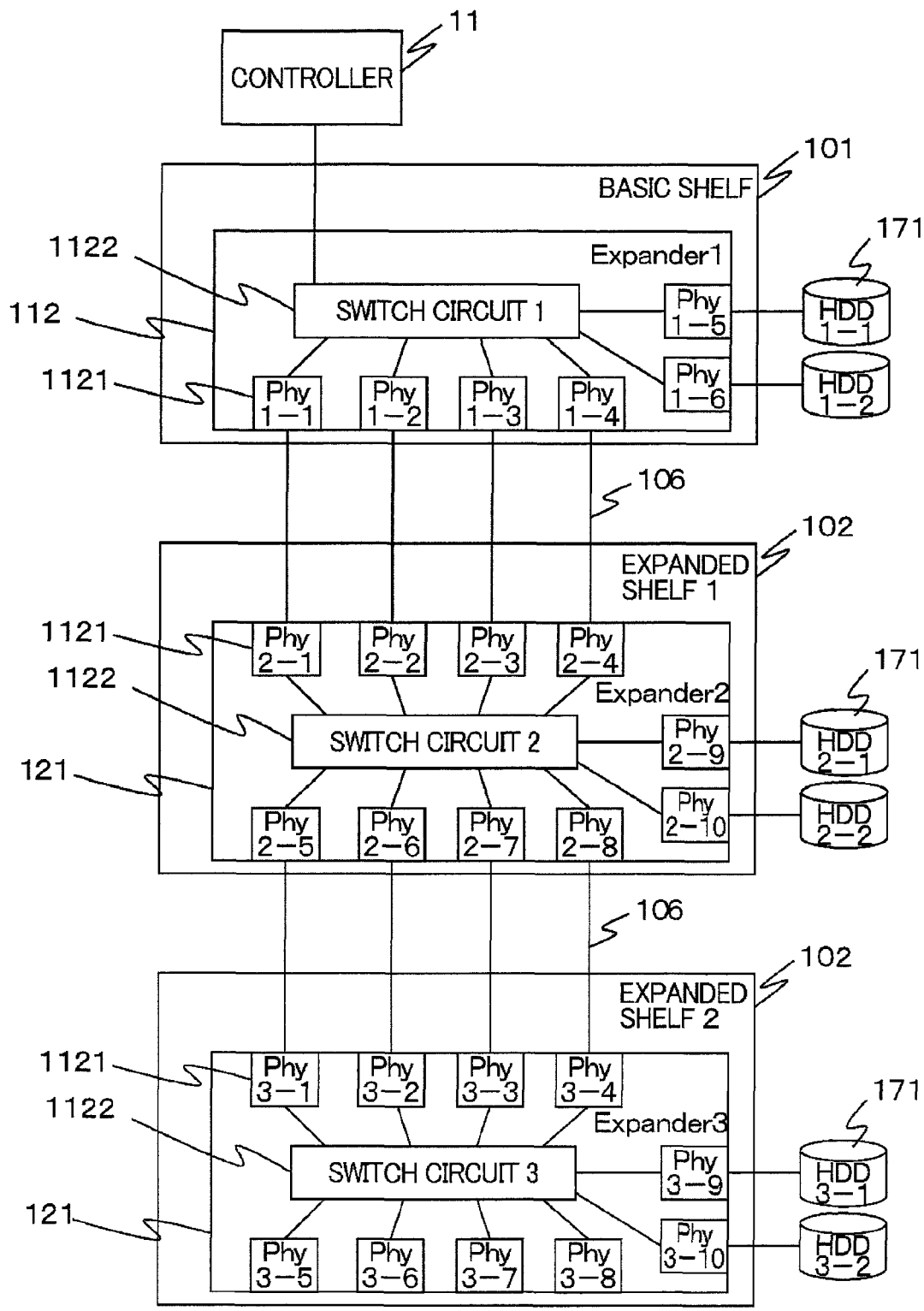
FIG. 13 is an example of how the controller 11 and the expanders 112, 121 are coupled to one another.

Note that the following description assumes that the storage apparatus 10 is configured as shown in FIG. 13. Specifically, the storage apparatus 10 includes one basic shelf 101 and two expanded shelves 102 (an "expanded shelf 1" and an "expanded shelf 2") that are cascade-coupled to the basic shelf 101. The expanders 112, 121 of the shelves ("Expander 1," "Expander 2," and "Expander 3") are physically coupled to one another as shown in the drawing. Moreover, it is assumed here that the controller 11 holds the device information management table 621 shown in FIG. 14 corresponding to the configuration shown in FIG. 13. It is further assumed that the expander 112 ("Expander 1") holds the coupled-device management table 721 shown in FIG. 15 corresponding to the configuration shown in FIG. 13, the expander 121 ("Expander 2") holds the coupled-device management table 721 shown in FIG. 16 corresponding to the configuration shown in FIG. 13, and the expander 121 ("Expander 3") holds the coupled-device management table 721 shown in FIG. 17 corresponding to the configuration shown in FIG. 13.

As FIG. 12 shows, the drive controller 111 of the controller 11 first selects one device for which a failure has been detected in the loopback diagnosis processing S1100, among all the devices designated by the device ID 6211 of the device information management table 621 (S1211). The device selected here is an (unselected) device for which "failure" is set in the failure information 6212, and is called a target device below. Note that the connection diagnosis processing S1200 is performed for all the target devices detected as having a failure in the loopback diagnosis processing S1100 (S1211, 1221).

Next, in S1212, the drive controller 111 acquires information on paths from the controller 11 to the target device from the coupled-device management table 721 managed by each of the expanders 112, 121. Then, based on the information acquired from the expanders 112, 121, the drive controller 111 checks whether or not the paths from the controller 11 to the target device include a redundant path (called a wide link below) (S1213).

Whether there is a wide link or not is determined as follows. For example, see the coupled-device management table 721 shown in FIG. 16 managed by the expander 121 ("Expander 2"). "Expander 2" is set in the coupled device ID 7212 of each of four Phy ports 1121 having the Phy IDs 7211 of "2-1" to "2-4", respectively. Accordingly, it can be seen that there is a fourfold wide link between "Expander 2" and "Expander 1." In addition, "Expander 3" is set in the coupled device ID 7212 of each of four ports Phy 1121 having the Phy IDs 7211 of "2-5" to "2-8", respectively. Accordingly, it can be seen that there is a fourfold wide link between "Expander 2" and "Expander 3."

When it is determined in S1213 that there is no wide link (S1213: NO), the drive controller 111 performs failure site locating processing S1800 to be described later (S1215).

When it is determined in S1213 that there is a wide link (S1213: YES), the drive controller 111 first extracts all the paths included in the wide link (S1216). For example, suppose that, in the configuration shown in FIG. 13, the storage drive 171 having the device ID of "HDD 3-1" is a target device, and that the coupled-device management tables 721 held by "Expander 1," "Expander 2," and "Expander 3" have contents shown in FIGS. 15 to 17, respectively. In this case, the drive controller 111 extracts 16 (=4×4) paths configured by the fourfold wide link existing between "Expander 2" and "Expander 1" and the fourfold wide link existing between "Expander 2" and "Expander 3."

Next, the drive controller 111 selects one of the paths extracted in S1216 (S1217), and disables all the paths except for the selected path (S1218). Note that all the paths except for the selected path are disabled by the drive controller 111 sending each of the expanders 112, 121 a command to disable their Phy 1121.

For example, suppose that a path "Phy 1-1" to "Phy 2-1" to "Phy 2-5" to "Phy 3-1" to "Phy 3-9" is selected in the configuration shown in FIG. 13. In this case, the drive controller 111 disables all the Phy ports 1121 configuring paths but the selected path, namely, for example, "Phy 1-2," "Phy 1-3," "Phy 1-4," "Phy 2-2," "Phy 2-3," "Phy 2-4," "Phy 2-6," "Phy 2-7," "Phy 2-8," "Phy 3-2," "Phy 3-3," and "Phy 3-4." Note that, supposing that the controller 11 side is a higher level side and the storage drive 171 side is a lower level side, a lower level Phy 1121 directly coupled to a higher level Phy 1121 that is disabled (e.g., the Phy 2-2 when the Phy 1-2 is disabled) does not necessarily have to be disabled. This is because disabling the higher-level Phy 1121 renders the lower-level Phy 1121 unusable anyway.

After disabling all the paths but the selected path (S1218), the drive controller 111 performs the failure site locating processing S1800 to be described later (S1219).

In S1220, the drive controller 111 determines whether all the paths extracted in S1216 have been processed (selected in S1217) or not. If all the extracted paths have been processed (S1220: YES), processing proceeds to S1221, and if not (S1220: NO), processing returns to S1217 to select an unselected path and repeat the similar processing.

Figure 18:
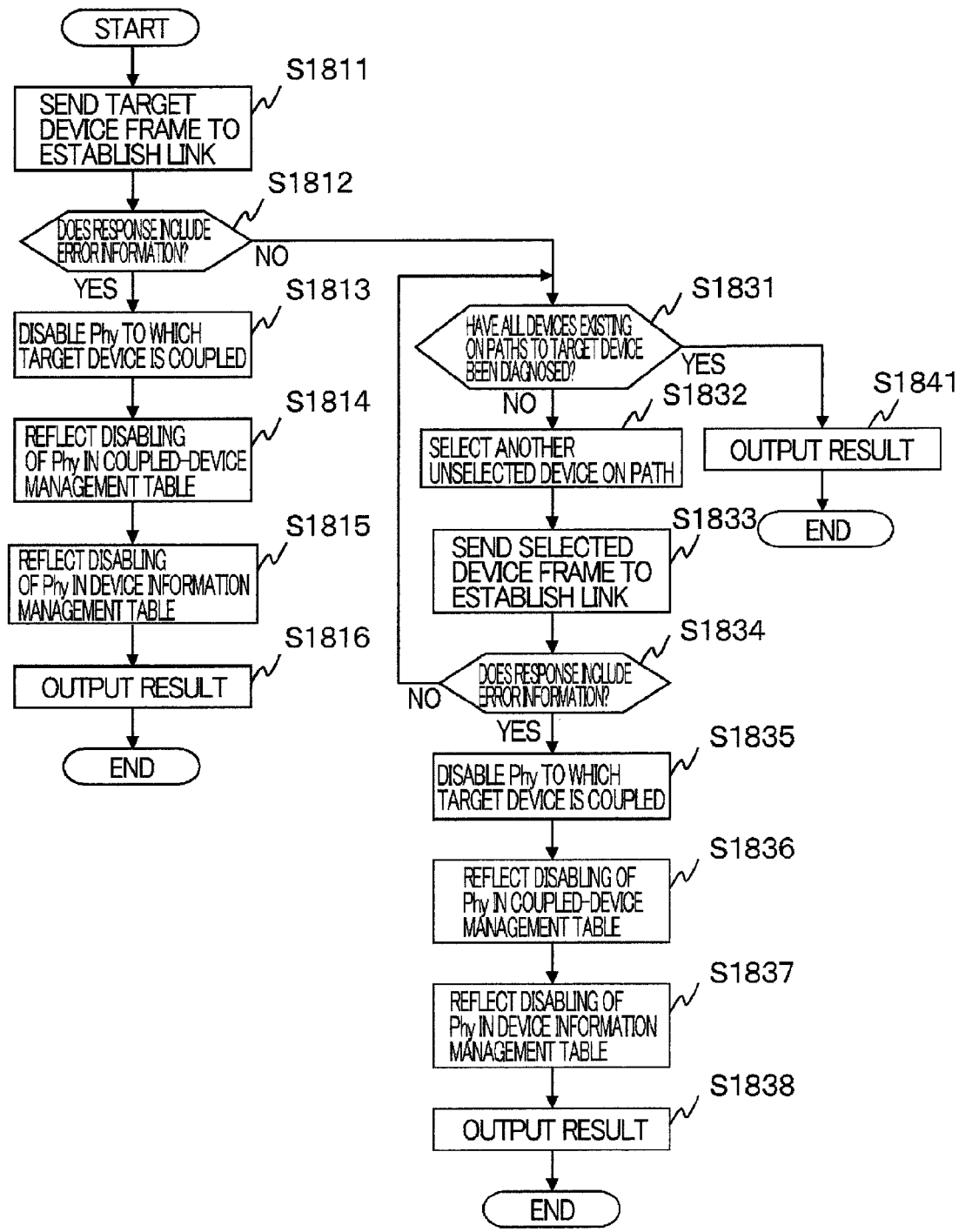
FIG. 18 is a flowchart illustrating failure site locating processing S1800.

FIG. 18 is a flowchart illustrating the failure site locating processing S1800 (processing performed in S1215 or S1219 in FIG. 12). The failure site locating processing S1800 is described below with the drawing.

First, the drive controller 111 sends a target device a frame for communication establishment (called a connection frame below) (S1811), and checks whether or not a response to that frame includes information indicating a failure (called failure information below) (S1812). Examples of the connection frame include "OPEN Address Frame" and the like.

When the response to the connection frame from the target device includes failure information (S1812: YES), the drive controller 111 disables a Phy 1121 of the expander 112, 121 to which the target device is coupled (S1813), and sets "disabled" for that Phy 1121 in the Phy state 7214 of the coupled-device management table 721 managed by the expander 112, 121 having the Phy 1121 thus disabled (S1814). Further, the drive controller 111 sets "disabled" for the target device in the Phy state 6213 of the device information management table 621 (S1815). Then, the drive controller 111 sends the external device 2 (e.g., an information apparatus used for failure monitoring) information indicating a failure site (in this case, information locating the target device) (S1816).

For example, suppose that, in the configuration shown in FIG. 13, the target device is the storage drive 171 having the device ID of "HDD 3-1." In this case, the drive controller 111 sends "HDD 3-1" a connection frame (S1811), and checks whether a response thereto includes failure information (S1812). When the response includes failure information (1812: YES), the drive controller 111 disables the Phy 1121 of the expander 121 to which "HDD 3-1" is coupled, namely, "Phy 3-9" of "Expander 3" (S1813). Then, the drive controller 111 sets "disabled" for "Phy 3-9" in the Phy state 7214 of the coupled-device management table 721 (FIG. 17) managed by "Expander 3" that has "Phy 3-9" thus disabled (S1814), and sets "disabled" for "HDD 3-1" in the Phy state 6213 of the device information management table 621 (S1815). In addition, the drive controller 111 sends the external device 2 a notification indicating that "HDD 3-1" is a failure site (S1816).

On the other hand, when the response to the connection frame from the target device does not include failure information in S1812 (S1812: NO), processing proceeds to S1831.

In S1831, the drive controller 111 determines whether all the devices existing on the paths from the controller 11 to the target device have been diagnosed or not. If there is an undiagnosed device (S1831: NO), processing proceeds to S1832. If all the devices have been diagnosed (S1831: YES), the drive controller 111 sends the external device 2 information indicating that a failure site cannot be located (S1841).

In S1832, the drive controller 111 selects an undiagnosed device existing on the paths to the target device. For example, suppose in the configuration shown in FIG. 13 that a path from the controller 11 to the target device ("HDD 3-1") is "Switch Circuit 1" to "Phy 1-1" to "Phy 2-1" to "Switch Circuit 2" to "Phy 2-5" to "Phy 3-1" to "Switch Circuit 3" to "Phy 3-9" to "HDD 3-1." In this case, the drive controller 111 selects any one of "Switch Circuit 3," "Switch Circuit 2," and "Switch Circuit 1."

Next, the drive controller 111 sends the selected device a connection frame (S1833), and checks whether or not a response to that frame includes information indicating a failure (called failure information below) (S1834). Then, if the response includes failure information (S1834: YES), the drive controller 111 disables the Phy 1121 that is directly coupled to the selected device and that is on the path from the controller 11 to the selected device (S1835), and sets "disabled" for that Phy 1121 in the Phy state 7214 of the coupled-device management table 721 managed by the expander 112, 121 that has the Phy 1121 thus disabled (S1836). Further, in the device information management table 621, the drive controller 111 sets "failure" for the selected device in the failure information 6212, and sets "disabled" for the selected device in the Phy state 6213 (S1837). Then, the drive controller 111 sends the external device 2 information indicating a failure site (in this case, information locating the selected device) (S1838).

For example, suppose that the same path as that described above is set in the configuration shown in FIG. 13, and that "Switch Circuit 3" is being selected in S1832. In this case, the drive controller 111 disables "Phy 3-1" that is directly coupled to "Switch Circuit 3" and that is on the path from the controller 11 to "Switch Circuit 3" (S1835), and sets "disabled" for "Phy 3-1" in the Phy state 7214 of the coupled-device management table 721 (FIG. 17) managed by "Expander 3" that has "Switch Circuit 3" (S1836). Then, in the device information management table 621, the drive controller 111 sets "failure" for "Expander 3" in the failure information 6212, and sets "disabled" for "Expander 3" in the Phy state 6213 (S1837). Then, the drive controller 111 sends the external device 2 information indicating that "Switch Circuit 3" (or "Expander 3") is a failure site (S1838).

For another example, suppose that the same path as that described above is set in the configuration shown in FIG. 13, and that "Switch Circuit 2" is being selected in S1832. In this case, the drive controller 111 disables "Phy 2-1" and "Phy 2-5" that are directly coupled to "Switch Circuit 2" and that exist on the path from the controller 11 to "Switch Circuit 2" (S1835), and sets "disabled" for each of "Phy 2-1" and "Phy 2-5" in the Phy state 7214 of the coupled-device management table 721 (FIG. 16) managed by "Expander 2" that has "Switch Circuit 2" (S1836). Then, in the device information management table 621, the drive controller 111 sets "failure" for "Expander 2" in the failure information 6212, and sets "disabled" for "Expander 2" in the Phy state 6213 (S1837). Then, the drive controller 111 sends the external device 2 information indicating that "Switch Circuit 2" (or "Expander 2") is a failure site (S1838).

For yet another example, suppose that the same path as that described above is set in the configuration shown in FIG. 13, and that "Switch Circuit 1" is being selected in S1832. In this case, the drive controller 111 disables "Phy 1-1" that is directly coupled to "Switch Circuit 1" and that exists on the path from the controller 11 to "Switch Circuit 1" (S1835), and sets "disabled" for "Phy 1-1" in the Phy state 7214 of the coupled-device management table 721 (FIG. 15) managed by "Expander 1" that has "Switch Circuit 1" (S1836). Then, in the device information management table 621, the drive controller 111 sets "failure" for "Expander 1" in the failure information 6212, and sets "disabled" for "Expander 1" in the Phy state 6213 (S1837). Then, the drive controller 111 sends the external device 2 information indicating that "Switch Circuit 1" (or "Expander 1") is a failure site (S1838).

As described above, the storage apparatus 10 of the present embodiment sends a connection frame to a device detected as having a failure in the loopback diagnosis processing S1100, and performs the connection-based diagnosis processing S1200 to locate a failure site based on a response to the connection frame. Accordingly, a failure site can be located with high accuracy, compared to a case of performing the loopback diagnosis processing S1100 only. In addition, since only the located site is stopped (disabled) and an unnecessary part is not stopped, unnecessary expansion of area affected by the failure can be prevented.

Moreover, when a response to a connection frame does not include failure information (S1812: NO), the storage apparatus 10 further performs the connection-based diagnosis for other devices (the switch circuits 1122 to which the drive controller 111 has not yet sent a connection frame) existing on the path to the target device (S1813: NO). Accordingly, even when many devices coexist on the path from the controller 11 to the target device, a failure site can be located reliably.

Further, when a wide link exists in paths from the controller 11 to the target device, the storage apparatus 10 disables paths included in the wide link except for a certain path, and thereafter starts the connection-based diagnosis processing S1200 (S1216 to S1220). Accordingly, even when there is a wide link, a failure site can be located with the same high accuracy as a case where there is no wide link.

Furthermore, after the diagnosis, the storage apparatus 10 sends the external device 2 information indicating a failure site (information locating the target device or information locating the Phy 1121 disabled). This allows an operator or the like to be informed of an accurate failure site.

Moreover, the storage apparatus 10 performs the loopback diagnosis processing S1100 only for the expander 112, 121 that has notified of a link error (S1118 to S1132). Accordingly, the loopback diagnosis processing S1100 is performed only for a necessary site. This allows a failure site to be located efficiently without putting unnecessary load on the storage apparatus 10.

Second Embodiment

Next, a second embodiment will be described. As described earlier, the virtual coupling function of the STP/SATA bridge 714 is suspended (inactivated) while no SATA device is coupled to any of the Phy ports 1121 of the expanders 112, 121. For this reason, if a failure is occurring in the virtual coupling function of the STP/SATA bridge 714, the failure cannot be detected by performing the loopback diagnosis processing S1100 or the connection-based diagnosis S1200 for the expander 112, 121 with no SATA device being coupled to the Phy 1121. Accordingly, in the present embodiment, the virtual coupling setting processor 614 sets the SATA device virtual coupling flag 7216 "ON" so that the loopback diagnosis processing S1100 and/or the connection-based diagnosis S1200 may be performed with the virtual coupling function of the STP/SATA bridge 714 being operated (activated) forcibly.

Figure 19:
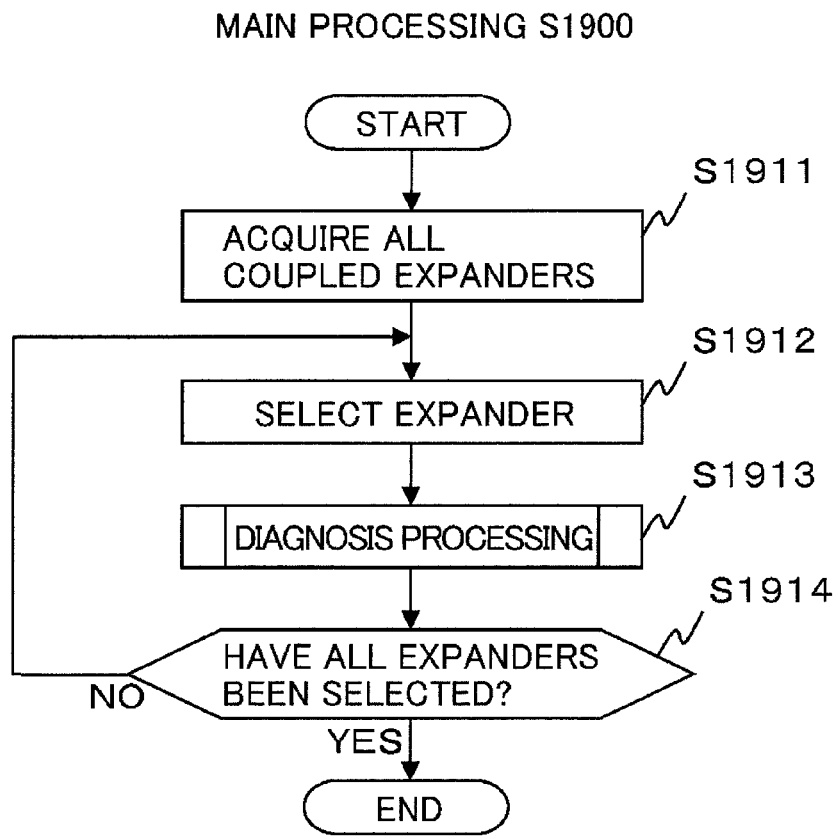
FIG. 19 is a flowchart illustrating main processing S1900.

FIG. 19 is a flowchart illustrating processing of the storage apparatus 10 according to the second embodiment (called main processing S1900 below). The main processing S1900 is described below with the drawing.

First, the drive controller 111 of the controller 11 refers to the device information management table 621 to acquire the device IDs of the expanders 112, 121 coupled under control of the controller 11 (S1911).

Next, the drive controller 111 sequentially selects the acquired expanders 112, 121 (S1912, S1914), and performs diagnosis processing 52000, to be described later, for each of the expanders 112, 121 (S1913).

Figure 20:
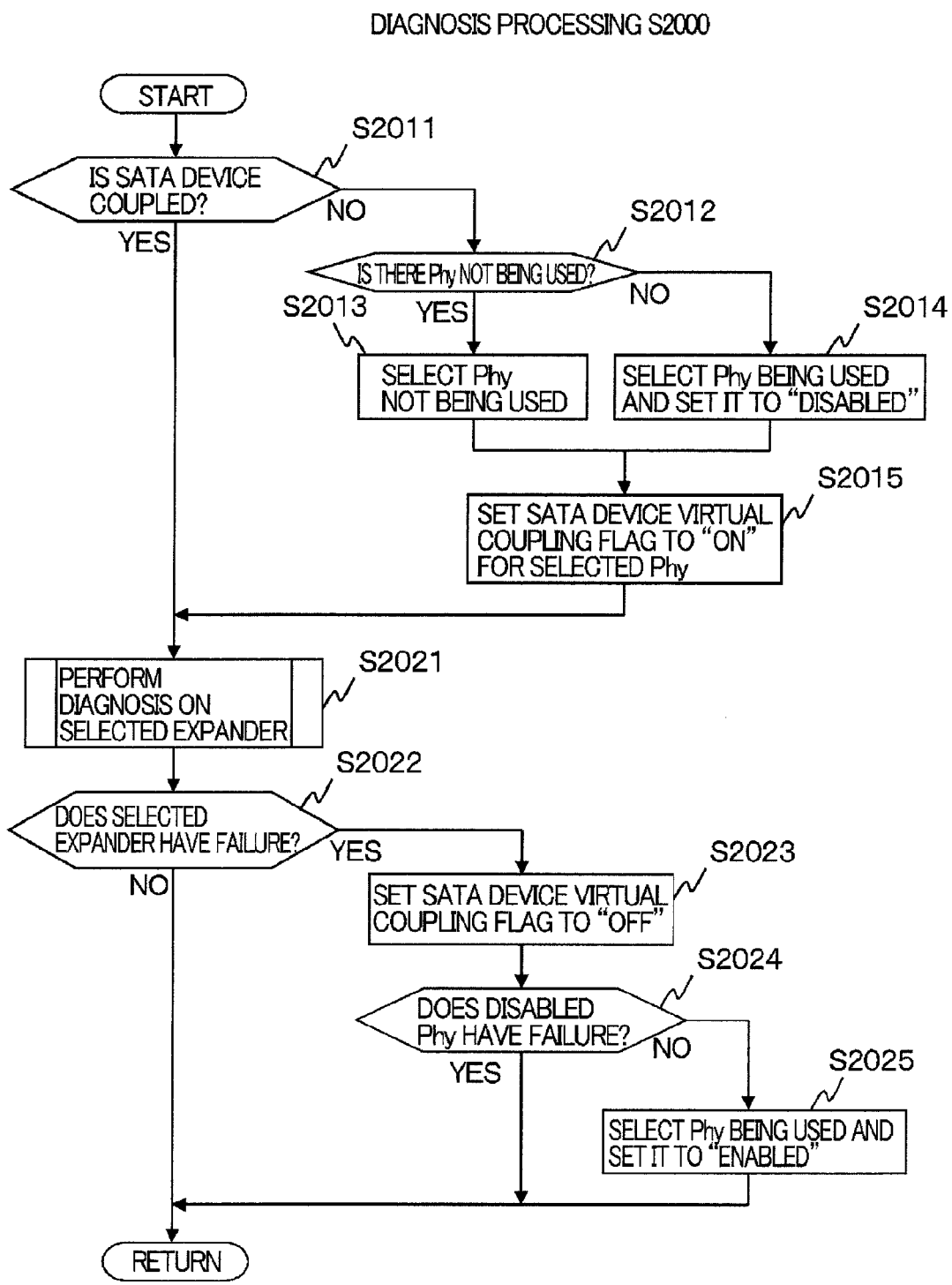
FIG. 20 is a flowchart illustrating diagnosis processing S2000.

FIG. 20 is a flowchart illustrating the diagnosis processing S2000 performed in S1913 in FIG. 19. The diagnosis processing S2000 is described below with the drawing.

First, the drive controller 111 checks whether at least one SATA devices is coupled to any of the Phy ports 1121 of the expander 112, 121 selected in S1912 (S2011). When a SATA device is coupled to the selected expander 112, 121 (S2011: YES), processing proceeds to S2021. When a SATA device is coupled to none of the Phy ports 1121 of the selected expander 112, 121 (S2011: NO), processing proceeds to S2012.

In S2012, the drive controller 111 accesses the coupled-device management table 721 of the selected expander 112, 121 to check whether the selected expander 112, 121 has any Phy 1121 not being used (having no coupled-device ID 7212) or not. When there is a Phy 1121 not being used (S2012: YES), processing proceeds to S2015. On the other hand, when there is no Phy 1121 not being used (S2012: NO), the drive controller 111 selects a Phy 1121 being used and sets "disabled" for the selected Phy 1121 in the Phy state 7214 of the coupled-device management table 721 (S2014). Then, processing proceeds to S2015.

In S2015, the drive controller 111 sets "ON" the SATA device virtual coupling flag 7216 of the selected Phy 1121 in the coupled-device management table 721 managed by the expander 112, 121 being selected. This forcibly activates the virtual coupling function of the STP/SATA bridge 714. Thereafter, processing proceeds to S2021.

In S2021, for the expander 112, 121 being selected, the drive controller 111 performs the loopback diagnosis processing S1100 and/or the connection-based diagnosis processing S1200 described in the first embodiment.

In S2022, the drive controller 111 determines, based on a result of the diagnosis processing in S2021, whether a failure has been detected or not. When no failure has been detected (S2022: YES), processing returns to S1914 in FIG. 19, and when a failure has been detected (S2022: NO), processing proceeds to S2023.

In S2023, the drive controller 111 sets the SATA device virtual coupling flag 7216 for the Phy 1121 that has been set to "ON" in S2015 back to "OFF." In S2024, the drive controller 111 determines whether the Phy 121 for which "disabled" is set in S2014 has been detected as having a failure by the diagnosis processing S2021. If a failure has been detected (S2024: YES), processing returns to S1914 in FIG. 19. If no failure has been detected (S2024: NO), the drive controller 111 sets "enabled" for the Phy 1121 for which "disabled" has been set in S2014, in the Phy state 7214 of the coupled-device management table 721 (S2025). Then, processing returns to S1914 in FIG. 19.

As described above, when no SATA device is coupled to any of the Phy ports 1121 of the expander 112, 121, the storage apparatus 10 forcibly operates (activates) the virtual coupling function of the STP/SATA bridge 714, and performs the loopback diagnosis processing S1100 and/or the connection-based diagnosis processing S1200 with the virtual coupling function being operated. Accordingly, even when no SATA device is coupled to the Phy 1121, a failure related to the virtual coupling function of the STP/SATA bridge 714 can be detected reliably, and a failure site can be located accurately.

Further, when no SATA device is coupled to any of the Phy ports 1121 of the expanders 112, 121 (S2011: NO) and when the expander 112, 121 does not have a Phy 1121 not being used (S2012: NO), the storage device 10 forcibly disables the Phy 1121 of the expander 112, 121, and then activates the function of the STP/SATA bridge 714. Accordingly, even when no SATA device is coupled to any of the Phy ports 1121 of the expanders 112, 121 and when the expander 112, 121 does not have a Phy 1121 not being used, the function of the STP/SATA bridge 714 can be activated surely, and then a diagnosis can be performed. Consequently, a failure related to the virtual coupling function of the STP/SATA bridge 714 can be detected surely, and a failure site can be located accurately.

The embodiments of the present invention have been described above. However, the embodiments have been given not for limitative interpretation of the present invention, but for easy understanding of the present invention. The present invention can be changed or modified without departing from the gist thereof, and the present invention includes its equivalents as well.

The invention claimed is:

1. A storage apparatus comprising:
   a controller that writes data into or reads data from a storage drive in response to a data input-output request sent from an external device; and
   at least one expander that includes a switch circuit having at least one physical port,
   the controller and the storage drive being communicatively coupled to each other through the switch circuit,
   wherein the controller performs a loopback diagnosis on the expander,
   the controller performs a connection-based diagnosis on a target device by sending the target device a connection frame, the target device being a device detected as having a failure as a result of the loopback diagnosis,
   when a response to the connection frame includes information indicating a failure, the controller disables the physical port to which the target device is coupled, or the physical port of the switch circuit existing on a path from the controller to the target device, and
   when there is a wide link in the path from the controller to the target device, the controller disables paths of the wide link except for a certain path included in the wide link, and then starts the connection-based diagnosis.

2. The storage apparatus according to claim 1, wherein
   when the response to the connection frame does not include information indicating a failure, the controller further performs the connection-based diagnosis by sending a connection frame to the switch circuit to which the connection frame has not been sent and which exists on the path from the controller to the target device to which the connection frame has been sent,
   when a response to the connection frame includes information indicating a failure, the controller disables the physical port of the switch circuit,
   the controller sends the external device any one of information locating the target device and information locating the physical port thus disabled,
   the controller sends a command to execute the loopback diagnosis to the expander which has notified of a link error,
   the expander includes a STP/SATA bridge that provides a virtual coupling function which makes a SATA device accessible as a SAS device when the SATA device is coupled to the physical port,
   when no SATA device is coupled to the physical port of the expander, the controller activates the virtual coupling function, and then performs at least one of the loopback diagnosis and the connection-based diagnosis,
   when no SATA device is coupled to the physical port of the expander and when the expander does not have any unused physical port, the controller first disables an in-use physical port of the expander, activates the virtual coupling function, and then performs at least one of the loopback diagnosis and the connection-based diagnosis,
   the controller includes: a network interface for communicating with the external device; a drive interface for communicating with the storage drive; a cache memory; and a data controller that performs data transfer between the controller and the cache memory or between the cache memory and the storage drive, and
   the expander includes: a processor; a memory; a network interface for communicating with the controller or another expander; the switch circuit having Phy ports each functioning as the physical port; an ECM (Expander Connection Manager) that performs routing setting and zoning setting; an ECR (Expander Connection Router) that controls data transfer between the Phy ports in accordance with any one of the routing setting and the zoning setting; and a BPP (Broadcast Primitive Processor) that monitors a connection state of a device coupled to each of the Phy ports or monitors the presence or absence of a failure in each of the Phy ports.

3. The storage apparatus according to claim 1,
   wherein when the response to the connection frame does not include information indicating a failure, the controller further performs the connection-based diagnosis by sending a connection frame to the switch circuit to which the connection frame has not been sent and which exists on the path from the controller to the target device to which the connection frame has been sent, and
   when a response to the connection frame includes information indicating a failure, the controller disables the physical port of the switch circuit.

4. The storage apparatus according to claim 1, wherein the controller sends the external device any one of information locating the target device and information locating the physical port thus disabled.

5. The storage apparatus according to claim 1, wherein the controller sends a command to execute the loopback diagnosis to the expander which has notified of a link error.

6. The storage apparatus according to claim 1, wherein the expander includes a STP/SATA bridge that provides a virtual coupling function which makes a SATA device accessible as a SAS device when the SATA device is coupled to the physical port, and when no SATA device is coupled to the physical port of the expander, the controller activates the virtual coupling function, and then performs at least one of the loopback diagnosis and the connection-based diagnosis.

7. The storage apparatus according to claim 6, wherein when no SATA device is coupled to the physical port of the expander and when the expander does not have any unused physical port, the controller first disables an in-use physical port of the expander, activates the virtual coupling function, and then performs at least one of the loopback diagnosis and the connection-based diagnosis.

8. The storage apparatus according to claim 1, wherein the controller includes:
   a network interface for communicating with the external device;
   a drive interface for communicating with the storage drive;
   a cache memory; and
   a data controller that performs data transfer between the controller and the cache memory or between the cache memory and the storage drive.

9. The storage apparatus according to claim 1, wherein the expander includes:
   a processor;
   a memory;
   a network interface for communicating with the controller or another expander;
   the switch circuit having Phy ports each functioning as the physical port;
   an ECM (Expander Connection Manager) that performs routing setting and zoning setting;
   an ECR (Expander Connection Router) that controls data transfer between the Phy ports in accordance with any one of the routing setting and the zoning setting; and
   a BPP (Broadcast Primitive Processor) that monitors a connection state of a device coupled to each of the Phy ports or monitors the presence or absence of a failure in each of the Phy ports.

10. A method for controlling a storage device that includes: a controller that writes data into or reads data from a storage drive in response to a data input-output request sent from an external device; and at least one expander that includes a switch circuit having at least one physical port, the controller and the storage drive being communicatively coupled to each other through the switch circuit, the method comprising:
    the controller performing a loopback diagnosis on the expander,
    the controller performing a connection-based diagnosis on a target device by sending the target device a connection frame, the target device being a device detected as having a failure as a result of the loopback diagnosis, and
    the controller disabling the physical port to which the target device is coupled, or the physical port of the switch circuit existing on a path from the controller to the target device, when a response to the connection frame includes information indicating a failure,
    wherein when there is a side link in the path from the controller to the target device, the controller disables paths of the wide link except for a certain path included in the wide link, and then starts the connection-based diagnosis.

11. The method for controlling a storage apparatus according to claim 10,
    wherein when the response to the connection frame does not include information indicating a failure, the controller further performs the connection-based diagnosis by sending a connection frame to the switch circuit to which the connection frame has not been sent and which exists on the path from the controller to the target device to which the connection frame has been sent, and
    when a response to the connection frame includes information indicating a failure, the controller disables the physical port of the switch circuit.

12. The method for controlling a storage apparatus according to claim 10, wherein the expander includes a STP/SATA bridge that provides a virtual coupling function which makes a SATA device accessible as a SAS device when the SATA device is coupled to the physical port, and when no SATA device is coupled to the physical port of the expander, the controller activates the virtual coupling function, and then performs at least one of the loopback diagnosis and the connection-based diagnosis.

13. The method for controlling a storage apparatus according to claim 12, wherein when no SATA device is coupled to the physical port of the expander and when the expander does not have any unused physical port, the controller first disables an in-use physical port of the expander, activates the virtual coupling function, and then performs at least one of the loopback diagnosis and the connection-based diagnosis.

* * * * *